July 3, 1934.  A. A. CANTON  1,965,173
APPARATUS FOR AND METHOD OF SYNCHRONOUSLY RECORDING
AND REPRODUCING SOUNDS AND PICTURES
Filed July 3, 1929   2 Sheets-Sheet 1
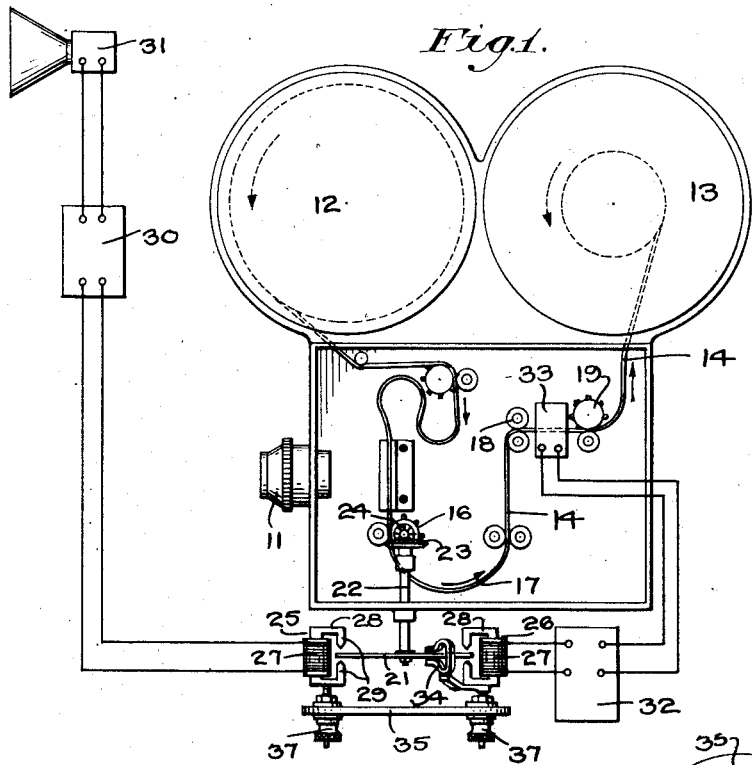
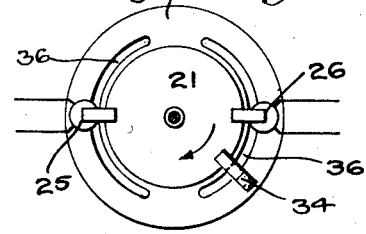
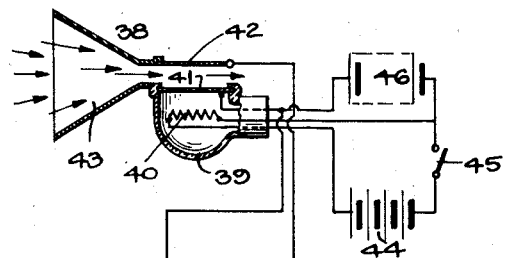
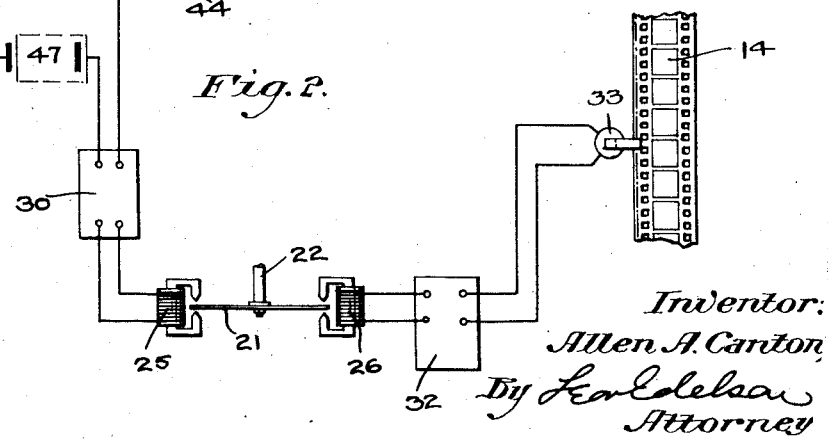

July 3, 1934.                A. A. CANTON                1,965,173
        APPARATUS FOR AND METHOD OF SYNCHRONOUSLY RECORDING
               AND REPRODUCING SOUNDS AND PICTURES
                    Filed July 3, 1929        2 Sheets-Sheet 2
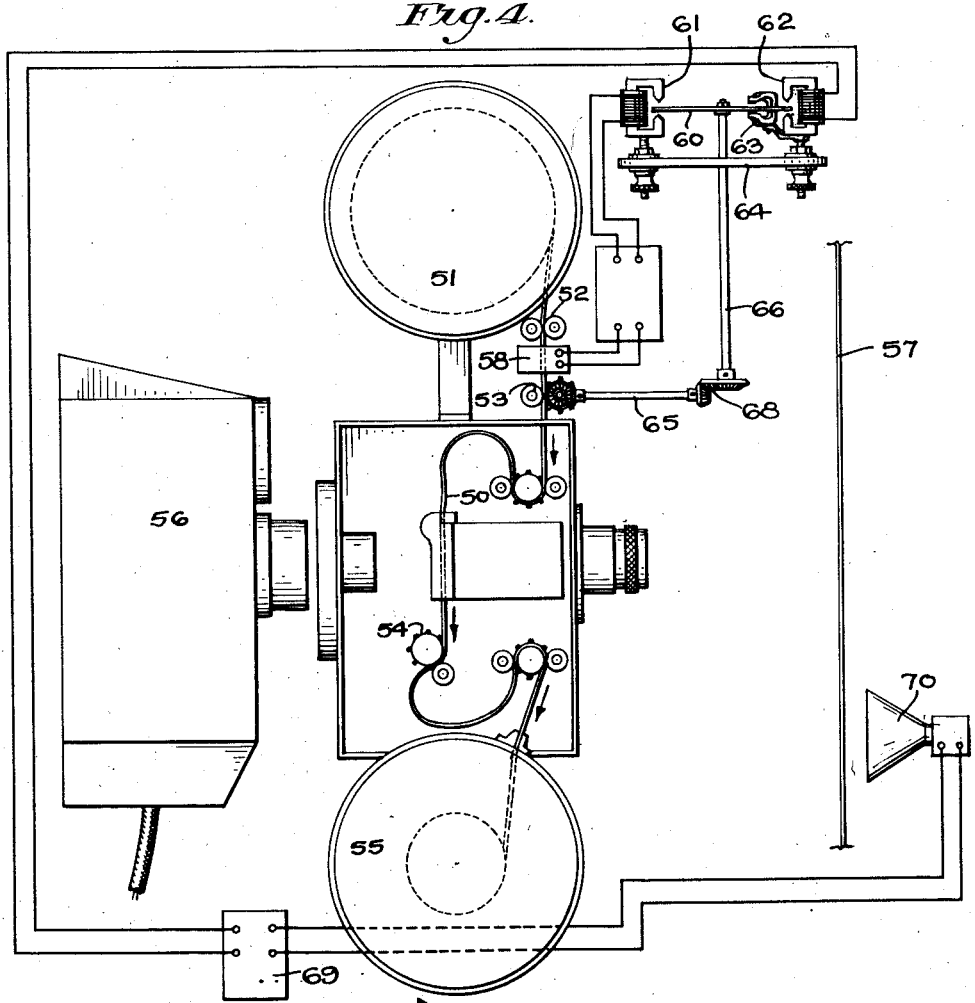
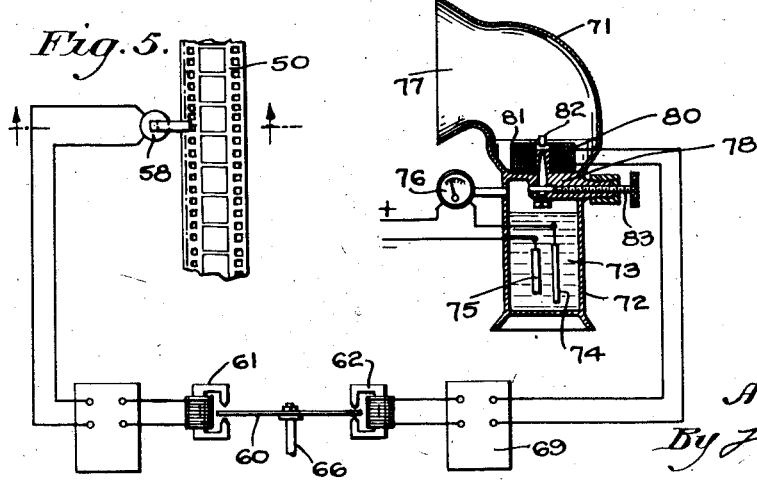
Inventor.
Al. n A. Canton,
By Leo Edelson
Attorney.

Patented July 3, 1934

1,965,173

UNITED STATES PATENT OFFICE 1,965,173

APPARATUS FOR AND METHOD OF SYNCHRONOUSLY RECORDING AND REPRODUCING SOUNDS AND PICTURES

Allen A. Canton, New York, N. Y.

Application July 3, 1929, Serial No. 375,627

8 Claims. (Cl. 88—16.2)

This invention relates generally to the art of recording and reproducing sounds and pictures, as in the so-called "talking pictures," and more particularly to improvements in an apparatus for and method of recording and reproducing from a photographic film light and sound impressions in synchronism with each other.

Heretofore and prior to this invention it has been an exceedingly difficult, if not an altogether impossible task, to obtain true synchronism between the picture which has been recorded upon a photographic film and the sound which is intended to accompany the picture. The same difficulty has been encountered in the various attempts to simultaneously reproduce the sounds and pictures. All of this is particularly true where the sound and light impressions are recorded upon and reproduced from a single photographic film, which, obviously, is the most ideal arrangement if true synchronization can be effected. Undoubtedly, one of the principal causes of failure in the various attempts to obtain more perfect synchronization between sound and picture recorded upon and reproduced from the same photographic film is due to the fact that the film, as used in modern cameras and projection apparatus, requires an intermittent motion, whereas the sound impressions can be properly recorded and reproduced only when the film is given a uniform and even movement as distinguished from the usual intermittent movement thereof. In an effort to compensate for this difference in character of movement necessary for the picture and for the sound film, resort has been had to the expedient of recording the sound upon the film either in advance of or behind the particular picture to which said sound is related. This expedient never proved to be successful because it necessarily precluded the attainment of true synchronization.

It is accordingly among the principal objects of the present invention to provide an apparatus which is adapted for use in conjunction with the standard types of motion picture cameras and projecting machines and by which it is possible to obtain mechanically and electrically perfect synchronization between sound and light impressions when recorded upon and reproduced from the same photographic film.

A further object of the invention is the provision of what is herein termed a "sound-holding relay," the purpose of which is to withhold actual recording of the original sound impressions until that instant when the recorded picture has reached the sound recording mechanism, the portion of the film upon which said picture has been recorded being passed through said sound recording mechanism at an even and uniform rate. In other words, the sound holding relay is operative to delay recording of the sounds upon the film until that time when the film has attained a uniform rate of travel as distinguished from the intermittent movement to which it is subjected during the process of recording the picture.

A still further object of the invention is to provide a sound-holding relay which is operative during the process of reproducing the sounds as the film progresses through the projecting machine to delay the reproduction of the recorded sound impressions until the pictures respectively corresponding thereto have assumed their proper positions with respect to the light source in the projection machine. To all intents and purposes this sound-holding relay as used in conjunction with the projection machine is similar to the relay used in conjunction with the picture recording camera.

Still another object of the invention is the provision of means for adjusting or regulating the operation of the sound-holding relay during the process of recording so as to vary the elapsed interval of time between the instant when a sound is originally produced and when it is actually recorded upon the film. During the process of reproducing the sounds and pictures, this capability of adjustment of the sound-holding relay makes it possible to retard or advance the time of reproducing the sound impressions on the film with respect to the pictures corresponding thereto, this being a desirable expedient in order to assure the most efficient operation in theatres of varying size.

A still further object of the present invention is the provision of improved sound translating devices adapted respectively for use in conjunction with standard motion picture cameras and projection machines. The first of these devices, ordinarily termed the microphone, is designed to convert the original sound impressions into corresponding electrical variations preliminarily to recording the latter upon the photographic film, this microphone being so constructed as to render the same much more sensitive to the sounds as originally produced. Not only is the microphone as constructed in accordance with the present invention of increased sensitivity but it is also more efficient in operation due to the fact that it affords a distortionless translation of the sound waves into corresponding electrical variations. The sound device, ordinarily termed the loud speaker, is designed and operates to efficiently and without distortion convert the electrical variations which are established as the photographic sound record passes through the projection machine into corresponding sound vibrations.

A further object of the invention is to provide an apparatus which is extremely simple and efficient in operation, both as regards the recordation of the sound impulses and the reproduction thereof and at the same time insure true synchronization with respect to the accompanying moving pictures.

Other objects of the invention and advantages resulting therefrom will appear more fully hereinafter.

The invention consists substantially in the combination, construction, location and relative arrangement of parts as well as in the method of recording and reproducing sounds in true synchronism with light pictures, all as will be described more fully in the annexed specification, as shown in the accompanying drawings, and as finally pointed out in the appended claims. In the said accompanying drawings, which are merely illustrative of certain preferred embodiments of the invention:—

Figure 1 is a diagrammatic view of a motion picture camera in which the sound recording apparatus of the present invention has been embodied;

Figure 2 is a diagrammatic view of the sound recording apparatus per se, the microphone being shown in section;

Figure 3 is a top plan view of the sound-holding relay as employed in the arrangement of Figure 1;

Figure 4 is a diagrammatic view of the projection machine in which the sound reproducing apparatus of the present invention has been embodied; and Figure 5 is a diagrammatic view of the sound reproducing apparatus per se, the loud-speaker being shown in vertical section.

Referring now to the drawings and more particularly to Figures 1, 2 and 3 thereof it will be observed that the sound recording apparatus of the present invention has been incorporated in a standard motion picture camera, designated generally by the reference numeral 10. This camera is provided with the usual lens 11 and with the reels 12 and 13 on which the film 14 is wound, it being understood that the film travels in the direction of the arrows shown in Figure 1. From the reel 12 the film is threaded through the regular camera mechanism, in this case illustrated by the frame 15, and thence through the driving mechanism comprising the usual sprocket wheel 16, which latter imparts an intermittent or step-by-step movement to the film. The film, after leaving the driving mechanism is looped, as at 17, preliminarily to passing through the spaced sets of feeding rolls 18 and 19. These feeding rolls are so arranged that the film is passed therethrough evenly and at a uniform constant rate of speed in contradistinction to the intermittent movement through the driving mechanism, this being permissible by reason of the slack afforded in the film between said driving mechanism and the rolls 18. The usual shutter and other mechanisms commonly employed in cameras are of course employed, but for simplicity of illustration such parts have been omitted from the drawings. The same is true as respects the projection apparatus shown in Figure 4.

Suitably mounted upon the camera box in any desired manner, is a device, designated generally by the reference numeral 20, for relaying the sound impressions as originally produced in the vicinity of the camera to the film 14 in the form of corresponding electrical variations. This sound-holding or sound-transferring device 20 comprises a steel disc 21 which is fixed to one end of for rotation with shaft 22, the opposite end of said shaft being provided with a beveled gear 23 for meshing engagement with a similar gear 24 carried by the sprocket wheel 16. It will thus be apparent that the driving mechanism effects rotation of the steel disc 21 at the same time that it imparts an intermittent movement to the film in order to position successive portions or frames thereof opposite the lens 11.

Operatively associated with the disc 21 are a pair of electro-magnetic devices 25 and 26 spaced apart circumferentially with respect to the disc periphery, each of these devices being provided with a solenoid 27 and a core 28 having opposed poles 29—29 between which the marginal portion of the disc is adapted to pass. Connected in circuit with the solenoid of the electro-magnet 25 through the amplifier 30 is a microphone 31 which is preferably of the form shown in Figure 2. Although I prefer to employ this type of microphone in order to obtain the best possible results it will be readily understood that insofar as the sound recording apparatus and process are concerned any of the standard forms of microphones now in more or less general use may be used in conjunction therewith. Connected in circuit with the solenoid of the electro-magnet 26 through the amplifier 32 is a sound recording device 33, preferably of the type wherein an actinic lamp is employed for producing upon the film a photographic record of the electrical variations set up in the microphone circuit. It will be observed that the recording device 33 is located between the feeding rolls 18 and 19 of the camera, that is, at a point with respect to which the film is moving at a uniformly constant speed.

The electro-magnets 25 and 26 constitute in effect the primary and secondary coils of an inductive coupling, the cores of which are linked together through the rotating steel disc 21. It will thus appear that when the sounds as originally produced are picked up by the microphone they will be converted into corresponding electrical variations and, by means of the electromagnet 25, impressed in the form of electromagnetic impulses upon the disc 21. These impulses in turn influence the electro-magnet 26 with the result that electrical variations corresponding to the original sound impressions are transmitted to the sound recording device 33 for recordation upon the photographic film.

Disposed to one side of the disc 21 is a permanent magnet 34 also provided with opposed pole pieces between which the marginal edge of the disc is adapted to pass, this magnet 34 being so positioned with respect to the electro-magnet 26 that any given radius of the disc traverses the former immediately after having traversed the latter. The function of this permanent magnet is to obliterate from the disc all sound impulses which were induced thereon by the primary electro-magnet 25 and which impulses had effected energization of the electro-magnet 26. From the foregoing it will be understood that the device 20, represented by the electro-magnets 25 and 26, the permanent magnet and the disc 21, operates to delay or retard the time of photographically recording the sound impressions upon the film until that instant when the portion of the film upon which the picture intended to accompany said impressions assumes a position between the feeding rolls 18 and 19.

Stationarily mounted with respect to the camera is a plate 35 having formed therein a pair of circumferentially extending slots 36. Securing elements 37 which project through said slots respectively support the electro-magnets 25 and 26 in adjusted position, the permanent magnet 34 being preferably supported commonly with the electro-magnet 26. By means of this expedient the electro-magnet 25 may be circumferentially shifted with respect to the electro-magnet 26 and the permanent magnet 34, or vice versa, and by so adjusting the relative positions of the magnets the time of recording the sound impulses upon the photographic film may be advanced or retarded as may be desired. Obviously, the adjustment is ordinarily such that the time interval which elapses for the sound impulses to travel with the disc 21 from the primary electro-magnet 25 to the secondary electro-magnet 26 equals the elapsed time interval for the film to pass from a point opposite the camera lens 11 to a point opposite the sound recording device 33.

I have termed the device 20 a "sound-holding relay" because of the fact that it is operative to retain the sounds associated with a given picture for a period of time equal to that needed for the film to assume an even movement or uniform rate of speed as distinguished from the intermittent movement thereof, the result of which is that true synchronization is obtained between the photographically recorded sounds and pictures.

While it is preferable to employ the rotatable steel plate as herein disclosed for retarding or delaying the photographic recordation of the sound impressions, it is possible and it might well be desirable, to employ continuous wire or steel bands in lieu of the disc.

Figure 2 is a diagrammatic representation of the sound recording circuit employed in conjunction with the camera of Figure 1. In lieu of the usual microphone I prefer to employ in said circuit a microphone of the type shown in section in figure and designated generally by the reference numeral 38. This improved microphone comprises an hermetically sealed bulb 39 within which is disposed a filament 40. Disposed to one side of the filament and arranged in such manner as to constitute a side wall of the bulb is an electrically conductive element in the form of a plate 41. Paralleling this plate 41 and supported in spaced relation with respect thereto is a second electrically conductive plate 42. A sound receiving horn 43 is secured to the bulb with the restricted end thereof in registry with the chamber or space afforded between the spaced plates 41 and 42.

A battery 44 is connected in circuit with and energizes the filament 40, a switch 45 being preferably included in this filament circuit. Interposed between the filament and the plate 41 is a plate battery 46, while a third battery 47 is connected in circuit between the plates 41 and 42. Included in this latter circuit is the amplifier 30 and the electro-magnet 25. The operation of this microphone may now be described as follows, it being understood that the sounds as originally produced in the vicinity of the camera are collected by the horn 43 and pass between the plates 41 and 42.

As clearly appears in Figure 2 the connections to the several batteries 44, 46 and 47 are such that the outer plate 42 is charged positively with respect to the inner plate 41, while the latter is charged positively with respect to the filament 40. Upon closing the switch 45 the filament 40 is energized and becomes incandescent with the result that the filament shoots off electrons at high velocity, each carrying its charge of negative electricity, those electrons being attracted to the positively charged plate 41. Due, however, to the fact that the plate 42 is highly positive with respect to the plate 41 a secondary emission of electrons takes place from said plate 41 to the outer plate 42.

The sounds collected by the horn 43 cause air vibrations to pass between the plates 41 and 42 which in turn establishes a variation in the electronic flow between said plates and a corresponding variation in current flow therebetween. The electrical variations so established are amplified by the amplifier 30 and energize the electro-magnet 25 in accordance with the sounds as originally produced. The varying electromagnet impulses set up by the primary magnet 25 are then temporarily recorded upon the rotating disc 21 for subsequent energization of the secondary or pick-up magnet 26 and finally transmitted to the sound recording device 33, all in the manner already described.

The reproducing or projection apparatus shown in Figure 4 will now be described. The film 50, upon which the pictures and their accompanying pictures have been recorded, is unwound from the upper reel 51 and threaded through the uniform feeding rolls 52 and 53, and through the intermittent driving mechanism 54 for subsequent winding upon the lower reel 55. It is after any given portion of the film has passed through the uniform feeding rolls 52 and 53 that said portion traverses the light rays emanating from the usual lamp box 56, this latter being operative to project the pictures upon the screen 57 in a manner well understood in the art.

Operatively associated with the film at a point opposite the uniform feeding rolls is a device 58 ordinarily comprising a photo-electric cell for converting the sound impressions as recorded upon the film into corresponding electrical variations. Operatively associated with the device 58 is a sound-holding relay 59, this relay being similar to that employed in conjunction with the recording apparatus of Figures 1 and 2 in that it also comprises a rotatable steel disc 60 adapted to receive electro-magnet impulses from a primary electro-magnet 61 for transmission to a secondary electro-magnet 62. As in the case of the relay employed in the recording apparatus the relay 59 is also provided with a permanent magnet 63 for obliterating the sound impulses recorded upon the disc and at the same time is provided with a slotted supporting plate 64 which permits relative adjustment to be had between the electro-magnets 61 and 62. The disc 60 rotates in unison with the uniform feeding rolls through the shafts 65 and 66 and the bevel gearing 67 and 68. Obviously, any other suitable drive for the disc may be used and in lieu of the disc itself a continuous steel band or wire may be employed. Connected in circuit with the secondary electro-magnet 62, through the amplifier 69, is the loud speaker 70.

The circuit and apparatus of Figure 4 having been generally described, exact nature thereof will be more clearly understood, by a detailed description of its operation. Inasmuch as the photo-electric cell device 58 is located in advance of the light source employed in the projection of the pictures upon the screen it will be apparent that said device will be influenced by the photographic record of a particular sound before the picture intended to accompany said sound is projected upon the screen. The time interval between that instant when the photo-electric cell is influenced by a particular sound impression and that instant when the picture corresponding to said impression is projected upon the screen is equal to the time which it takes for said picture to travel from a position between the uniform feeding rolls 52 and 53 to a position opposite the lamp box.

The sound-holding relay 59 compensates for this difference in time and operates to effect synchronous reproduction of a given picture and its accompanying sound or sounds. The operation of the sound-holding relay 59 in withholding or delaying the reproduction of the sound record until the time of reproduction of the picture corresponding thereto is similar to that of the sound-holding relay 20 of Figures 1 and 2, the sole difference being that in the recording process the relay operates to delay recordation of the sound impression until the exposed film reaches the uniform feeding rolls, whereas in the reproducing process the relay operates to delay reproduction of the sound record until the film reaches the intermittent driving mechanism therefor. Another way of stating this difference is that while in the recording process the relay operates to transmit the sound impulses to the film after the accompanying picture has been recorded upon the film, in the reproducing process the relay operates to receive the sound impulses before and withholds reproduction thereof until that instant when the accompanying picture is reproduced upon the screen. Synchronous reproduction of the recorded sounds and pictures is thus assured.

By virtue of the fact that the electro-magnets 61 and 62 are relatively adjustable whereby the same may be separated by a greater or lesser distance, the time interval elapsing between when the photo-electric cell is influenced by the sound impressions upon the film and when these impressions are actually reproduced in the loud speaker 70 may be varied at will. In certain theatres the acoustics is such that for best results the sound reproduction should be retarded somewhat, while in other theatres the sound reproduction should be advanced with respect to the picture reproduction. This adjustment is readily accomplished merely by varying the relative positions of the electro-magnets 61 and 62 of the sound-holding relay 59 upon the slotted supporting plate 64 therefor.

Figure 5 is a diagrammatic representation of the sound reproducing circuit employed in conjunction with the projection apparatus of Figure 4. While it is to be clearly understood that any type of loud-speaker may be employed in the reproduction of the sounds as recorded upon the film, I prefer to employ a loud speaker of the type shown in section in Figure 4 and designated generally by the reference numeral 71. This speaker comprises a casing or container 72 adapted to receive a suitable liquid 73 within which the electrodes 74 and 75 are submerged. The liquid 73 is of such character that when the current is passed therethrough from electrode 74 to electrode 75 the liquid is decomposed into a gas. The pressure of the gas so generated is regulated or controlled by the control gauge 76.

The upper end of the container is provided with a horn 77, the throat of which is separated from the interior of gas-generating chamber by an aperture or web 78 having a central aperture 79 formed therein. Surrounding the aperture 79, which is preferably of elongated character, is a solenoid 80 the terminals of which are connected across the output of the amplifier 69. Operatively associated with the solenoid and adapted to be influenced by the varying electrical impulses received thereby is an armature preferably in the form of a taut wire 81 having the opposite ends thereof secured to the diametrically opposed sides of the horn 77. A miniature valve 82 is carried by the armature 81 for registry with the central aperture or passage 79. It will be apparent that as the armature vibrates under the influence of the solenoid 80 this valve 82 will operate to open and close the passage 79 leading between the interior of the liquid container and the interior of the horn 77. The gas which is generated within this container is thus permitted to escape through the aperture in accordance with the electrical variations established as the photographic sound record traverses the photo-electric cell device 58 and is deflected through the horn to reproduce the recorded sounds. The volume of the gas which is permitted to escape by way of the valve 82 is preferably regulated by a needle valve 83.

While I have shown and described what I now consider to be preferred forms of apparatus for recording and reproducing sounds in synchronism with light pictures it will be understood, of course, that various changes and modifications may be made from time to time both in the apparatus for and in the method of synchronously recording and reproducing sounds and pictures without departing from the spirit or principles of the invention. It is accordingly intended to claim the invention or inventions broadly as well as specifically as indicated by the appended claims.

What is claimed as new and useful is:—

1. In an apparatus for recording motion pictures and sounds upon a single photographic film for synchronous reproduction therefrom, in combination, a camera mechanism including means for imparting an intermittent movement to the film and means for imparting a uniform movement to said film after the same has progressed a predetermined distance through said mechanism, means for photographically recording pictures upon said film during the intermittent movement thereof, a sound-holding device, means for temporarily recording sounds upon said device simultaneously as the pictures corresponding thereto are recorded upon the film, and means for transferring said sound record to the portion of said film containing said corresponding pictures when said portion has assumed a uniform movement.

2. In an apparatus for recording motion pictures and sounds for synchronous reproduction, in combination, a camera mechanism, a sound recording mechanism, means for temporarily receiving the sounds to be recorded prior to their permanent recordation upon a photographic film, means for transferring the temporarily recorded sounds to said film, and means for delaying the permanent recordation of the sounds corresponding to the photographed pictures for an interval of time equal to that required for the film to travel from picture recording position to sound recording position.

3. The method of producing a film with pictures and the accompanying sound in line laterally, consisting in producing the sound simultaneously with the taking of the picture, in moving the film for successively recording the picture and accompanying sound and in delaying the transmission of the sound to the sound recorder by the introduction of a time delay between a sound pick-up source and said recorder.

4. A method of simultaneously projecting and reproducing moving pictures and accompanying sound consisting in passing a film, having the pictures and accompanying sound laterally in line with each other, first to a sound reproducer and then to a picture projector and in delaying the transmission of the sound from the point of translation to the point of emission commensurate with the time of passing the film from the sound reproducer to the picture projector.

5. A method of translating pictures and accompanying sounds to and from a film with the pictures and accompanying sound records in line laterally on said film consisting in passing said film successively from one translating unit to another for alternate translation of pictures and accompanying sound records and in introducing a time delay in the transmission of sound translatable electrical waves commensurate with the time consumed in passing the film from one translating unit to the other.

6. In a sound picture recording system, a film, a recording device arranged to successively pass said film from a picture recording lens system to a sound recording apparatus, a sound pick-up device, and means including a delay circuit between said pick-up device and said sound recording apparatus for producing a film with the sound in line laterally with each picture which it accompanies.

7. In a sound picture recording system, a film, a recording device arranged to record both picture and sound on a single film, said recording device having the picture recording lens system separated from the sound recording apparatus in such manner that a period of time is consumed in passing said film from the lens system to the sound recording apparatus, a microphone and a transmission circuit connected with said sound recording apparatus, and means in said circuit for delaying the transmission of sound from said microphone to said sound recording apparatus for a time period equivalent to the time lapse in passing the film from the lens system to the sound recording apparatus.

8. In a sound picture recording system, a film, a recording device arranged to record both picture and sound on a single film, said recording device having the picture recording lens system separated from the sound recording apparaus in such manner that a period of time is consumed in passing said film from the lens system to the sound recording apparatus, a microphone and a transmission circuit connected with said sound recording apparatus, and means in said circuit for delaying the transmission of sound from said microphone to said sound recording apparatus for a time period equivalent to the time lapse in passing the film from the lens system to the sound recording apparatus, whereby the picture and accompanying sound are recorded on said film with the sound in line laterally with each picture which it accompanies.

ALLEN A. CANTON.